United States Patent [19]

Hoffman

[11] 3,762,303
[45] Oct. 2, 1973

[54] SNAP-IN COLLAR FOR AIR OUTLET ASSEMBLY

[75] Inventor: Donald E. Hoffman, West Seneca, N.Y.

[73] Assignee: General Motors Corporation, Detroit, Mich.

[22] Filed: Sept. 10, 1971

[21] Appl. No.: 179,281

[52] U.S. Cl............................ 98/114, 98/2, 49/504
[51] Int. Cl............................................. F24f 13/00
[58] Field of Search................... 98/2.05, 2.08, 2.09, 98/2.16, 71, 110, 111, 112, 114, 121; 285/201; 251/365; 52/214; 49/465, 504

[56] References Cited
UNITED STATES PATENTS

| 3,381,601 | 5/1968 | McCabe | 98/121 |
| 3,641,913 | 2/1972 | Dennis | 98/110 |
| 3,648,592 | 3/1972 | Nieboer | 98/114 |

FOREIGN PATENTS OR APPLICATIONS

| 502,994 | 5/1954 | Canada | 98/110 |
| 532,428 | 10/1954 | Belgium | 98/114 |

Primary Examiner—William F. O'Dea
Assistant Examiner—Paul Devinsky
Attorney—William S. Pettigrew et al.

[57] ABSTRACT

A snap-in collar for mounting an air outlet grille assembly in an air duct is disclosed. In a preferred embodiment the collar has two sets of deflectable wing tabs mounted on opposite sides of the rear of the collar for snapping the collar into the air duct during assembly. The leading edge of each wing tab is tapered to facilitate insertion into the duct and the trailing edge of each tab is tapered to provide for tight, rattle-free contact with the duct wall.

2 Claims, 5 Drawing Figures

PATENTED OCT 2 1973

3,762,303

INVENTOR.
Donald E. Hoffman
BY
George A. Grove
ATTORNEY

SNAP-IN COLLAR FOR AIR OUTLET ASSEMBLY

This invention relates to means for assembling air outlet grille assemblies in an air duct. More specifically, this invention pertains to a snap-in collar structure for supporting an air outlet assembly in the air conditioner duct of an automobile.

In automobile air conditioners a number of air outlet assemblies are provided to control the quantity and direction of the flow of air into the passenger compartment. Sometimes these air outlet assemblies are mounted in the instrument panel with ducts running from the air conditioner apparatus to the outlet. In other arrangements a main air conditioner duct is located beneath the instrument panel with outlet grille assemblies inserted at suitable positions along the main duct.

It is an object of the present invention to provide an inexpensively constructed yet highly useful and effective collar construction for rapidly assembling and mounting a conventional air outlet grille in an air duct in sealing engagement therewith.

It is a more specific object of the present invention to provide a unitary snap-in collar structure for mounting an adjustable air outlet grille in an air duct in rattle-free engagement therewith wherein deflectable tab means are employed to tightly engage the duct wall in the region of the opening despite variations in the thickness of the wall.

In accordance with a preferred embodiment of my invention these and other objects and advantages are accomplished by providing a generally rectangular collar member having a front facing the automobile passenger compartment and a back side adjacent the air duct. Molded to the rear side of the main collar portion are sealing lips arranged and constructed to fit into an opening provided in the duct wall. Also molded to the rearward side of the main collar member, preferably on opposing horizontal or vertical legs thereof, are flange members adapted to carry an adjustable air outlet grille assembly. Affixed to each of the two flange members are two deflectable wing tabs. The leading edge of each wing tab (with respect to the direction of insertion of the collar into the duct opening) is progressively tapered so as to facilitate assembly. The trailing edge of each wing tab is also tapered to tightly engage the duct wall regardless of its thickness. When the collar and air outlet assembly are inserted into the duct opening the tabs are deflected from their free position to permit insertion of the collar. Once the tabs have passed through the opening and the collar is inserted, they snap back to their free position and tightly engage the duct wall. This collar structure is molded in one piece of a suitable thermoplastic resin, such as acrylonitrile-butadiene-styrene polymer.

A detailed description of the subject snap-in collar structure will more clearly disclose the invention therein. Reference will be made to the drawings, in which.

Figure 1:
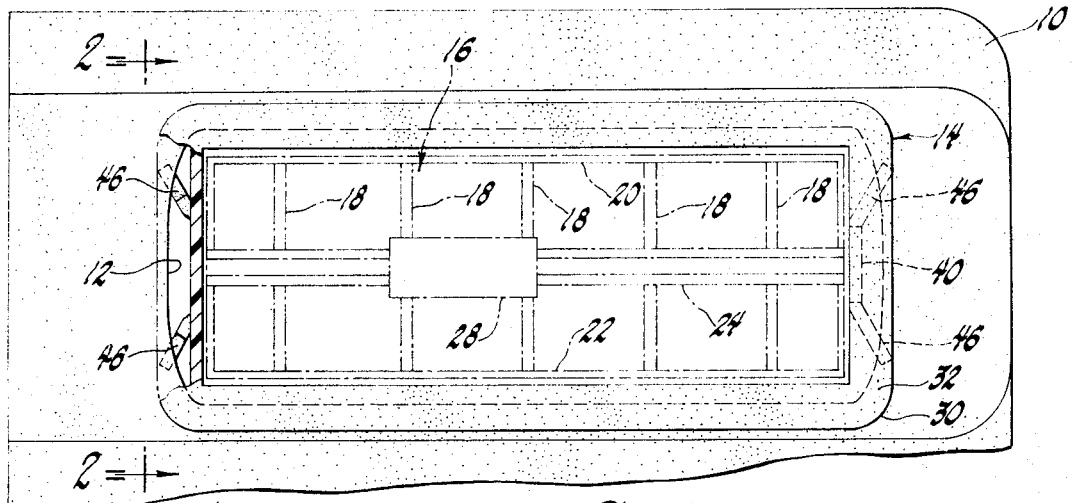
FIG. 1 is a plan view partially broken away and in section showing the snap-in collar carrying a typical air outlet grille assembly and mounted in an air duct.

Shown in FIG. 1 is a portion of an air conditioner air duct 10 such as would be placed under the instrument panel in an automobile passenger compartment. In the operation of the automobile air condition, cool, dehumidified air is blown through the duct and out through a number of openings in the duct wall into the passenger compartment. An opening 12 in the wall of duct 10 is indicated generally by the dotted line - solid line combination of FIG. 1. Inserted into the opening is the subject snap-in collar, indicated 14, carrying an adjustable air outlet assembly 16. Air outlet assembly 16 is of conventional design and forms no part of this invention. As shown, it contains a plurality of vertically aligned louvers 18 which are carried and supported on a top horizontal member 20, bottom horizontal member 22 and intermediate horizontal member 24. The up-down position of the air outlet assembly is adjusted by rotating it about short horizontal pivot pins at either end of the assembly (best seen at 26 in FIG. 3). The sideways direction of the air flow through the assembly is adjusted by moving adjusting knob 28 which is mechanically linked to the louvers 18 by means not shown.

As indicated above the air outlet grille assembly 16 is carried by collar 14 and mounted thereby into opening 12 of the duct 10. Collar member 14 has a main rectangular collar portion 30 with a forward surface 32 facing the automobile passenger compartment and a rearward surface 34 facing air duct 10. Integrally formed at the rearward surface 34 of main collar portion 30 are horizontal sealing lips 36 and vertical sealing lips 38. Also integrally joined to the rear surface of the collar are flange members 40, each containing hole 42 and slot 44 for insertion of the horizontal pivot pins 26 of the air grille.

Figure 2:
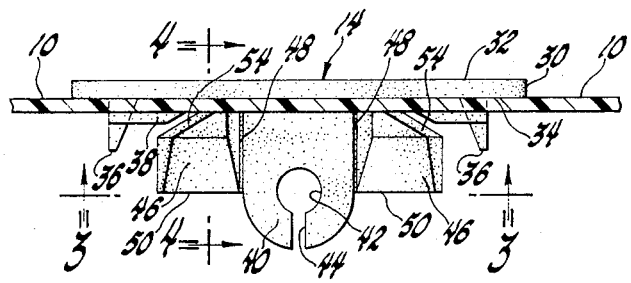
FIG. 2 is a sectional view taken along line 2—2 of FIG. 1.
Figure 3:
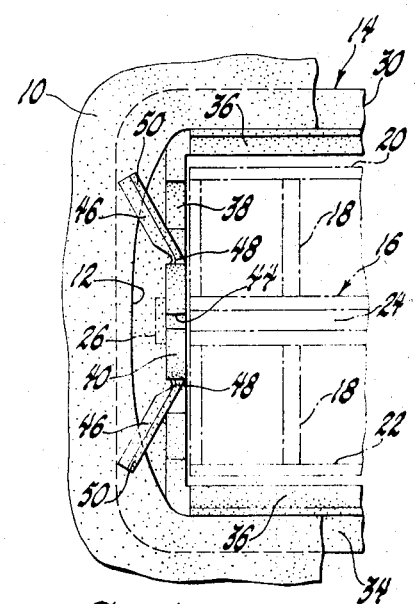
FIG. 3 is a view of the back side of a portion of a collar and outlet grille assembled in an air duct along line 3—3 of FIG. 2.
Figure 5:
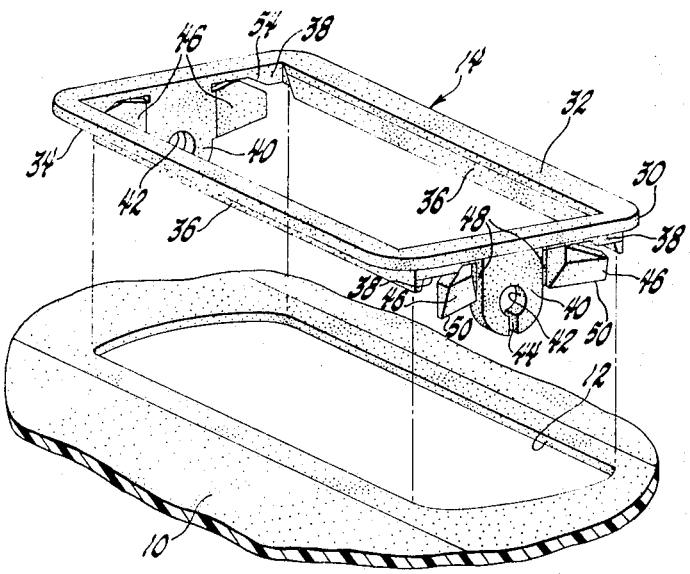
FIG. 5 is an exploded perspective view of my snap-in collar positioned over an opening in an air duct wall.
Figure 4:
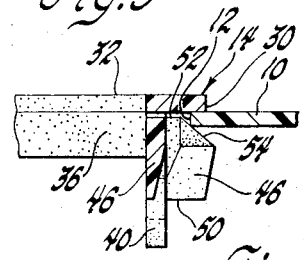
FIG. 4 is a section taken along line 4—4 of FIG. 2.

Integrally formed with each flange 40 are two deflectable wing tabs 46. As best seen in FIGS. 1 and 3 the wing tabs, which are joined to flanges 40 through integral hinges 48, assume in their free position an angle of about thirty degrees with respect to the vertical leg of the collar and the opening in the duct wall. Each tab 46 has a leading edge 50 and a trailing edge 52. The tab 46 is tapered so as to become progressively thicker from the narrow leading edge 50 in the direction of the trailing edge. This taper, coupled with the deflectability of the tab 46 about integral hinge 48, facilitates insertion of the collar into the duct opening 12. Furthermore, at least a portion of the trailing edge 52 has a progressive taper 54 in the direction from the trailing edge 52 of the deflectable tab 46 toward the leading edge 50, as shown in FIGS. 2 and 3. This taper 54 permits the tab 46 to tightly engage the duct wall 10 as the tab snaps to its free position, regardless of minor variations in the thickness of the duct wall.

Thus, in accordance with the subject invention a suitable air grille assembly is attached to the subject collar member, and the collar member inserted into the duct opening. This is accomplished by deflecting the tapered wing tabs inwardly from their free position, slipping the deflected tabs past the duct wall and then permitting them to snap back into tight engagement therewith. Of course, the flange construction or other suitable mounting construction for carrying the air outlet grille may be widely modified in accordance with known art. Once inserted, the inner surface of the collar member and/or the sealing lips engage the opening in the duct wall to provide some sealing therewith. Air being circulated through the duct is then controlled and directed into a room or automobile passenger compartment by the adjusting of the grille member.

While my invention has been described in terms of a preferred embodiment thereof, it will be appreciated that other forms could readily be adapted by one skilled in the art. Accordingly, the scope of this invention is to be limited only by the following claims.

What is claimed is:

1. A collar for mounting an air outlet grille member in an opening in an air duct, said air duct having an outer wall surface, an inner wall surface and an edge surface at said opening intersecting said wall surfaces at outer and inner corners, respectively, said collar comprising a collar member having a front side and a back side, said back side being adapted to bear directly against said outer duct wall surface in the operative position of said collar, two flange members affixed to said back side of said collar member at opposing locations for carrying an air outlet member, and two wing tabs on each of said flange members each pointing away from a said air outlet member, the distance between the outer points of one tab and the outer points of another tab in a said opposing position being greater than the corresponding dimension of said duct opening, said wing tabs being deflectable about an axis generally perpendicular to said duct opening from a normal free position for insertion of said tabs into said duct opening, said tabs having tapered leading edges operative to facilitate such insertion, said tabs being self-returnable after insertion into said opening toward said free position, said tabs having progressively tapered trailing edges with a said trailing edge having an inner end with respect to said collar member and an outer end, a said tab being positioned and adapted to tightly engage said inner corner of said duct wall intermediate said ends of said trailing edge as said tab attempts to return to its said free position by rotating about said axis, said inward end of said tab trailing edge then being outside of said inner duct wall surface, said tab thus being operative to wedge said duct wall against said back side of said collar member in rattle-free engagement therewith despite any minor variations in the thickness of said wall from a predetermined dimension.

2. A molded unitary collar for mounting an air outlet grille member in an opening in an air duct, said air duct having an outer wall surface, an inner wall surface and an edge surface at said opening intersecting said wall surfaces at outer and inner corners, respectively, said collar comprising a substantially rectangular collar member having a front side and a back side, said back side being adapted to bear directly against said outer duct wall surface in the operative position of said collar, two flange members affixed to opposing rectangular legs of said collar member at the back side thereof for movably carrying a said air outlet member, and two wing tabs on each of said flange members each pointing away from a said air outlet member, the distance between the outer points of one said tab and the outer points of another tab on an opposing leg of said collar member being greater than the corresponding dimension of said duct opening, said wing tabs being deflectable about an axis generally perpendicular to said duct opening from a normal free position for insertion of said tabs into said duct opening, said tabs having tapered leading edges operative to facilitate such insertion, said tabs being self-returnable after insertion into said opening toward said free position, said tabs having progressively tapered trailing edges with a said trailing edge having an inner end with respect to said collar member and an outer end, a said tab being positioned and adapted to tightly engage said inner corner of said duct wall intermediate said ends of said trailing edge as said tab attempts to return to its said free position by rotating about said axis, said inward end of said tab trailing edge then being outside of said inner duct wall surface, said tab thus being operative to wedge said duct wall against said back side of said collar member in rattle-free engagement therewith despite any minor variations in the thickness of said wall from a predetermined normal dimension.

* * * * *